(12) United States Patent
Severyn

(10) Patent No.: US 12,330,453 B2
(45) Date of Patent: Jun. 17, 2025

(54) TIRE WITH EMERGING SNOW FEATURE

(71) Applicant: Bridgestone Americas Tire Operations, LLC, Nashville, TN (US)

(72) Inventor: David M. Severyn, North Canton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 469 days.

(21) Appl. No.: 17/297,032

(22) PCT Filed: Dec. 18, 2019

(86) PCT No.: PCT/US2019/067136
§ 371 (c)(1),
(2) Date: May 26, 2021

(87) PCT Pub. No.: WO2020/132044
PCT Pub. Date: Jun. 25, 2020

(65) Prior Publication Data
US 2022/0024258 A1    Jan. 27, 2022

Related U.S. Application Data

(60) Provisional application No. 62/782,384, filed on Dec. 20, 2018.

(51) Int. Cl.
*B60C 11/13* (2006.01)
*B60C 11/03* (2006.01)

(52) U.S. Cl.
CPC ... *B60C 11/1353* (2013.01); *B60C 2011/0369* (2013.01); *B60C 2011/1361* (2013.01)

(58) Field of Classification Search
CPC ..... B60C 2011/0369; B60C 2011/1361; B60C 11/1353; B60C 11/1369
See application file for complete search history.

(56) References Cited

U.S. PATENT DOCUMENTS 9,290,058 B2    3/2016  Tanka
2006/0016536 A1    1/2006  Maxwell et al.
(Continued)

FOREIGN PATENT DOCUMENTS

DE    102006047324    4/2008
DE    202014006967    * 10/2014
(Continued)

OTHER PUBLICATIONS

DE 202014006967 Machine Translation (Year: 2014).*
(Continued)

*Primary Examiner* — Katelyn W Smith
*Assistant Examiner* — Wendy L Boss
(74) *Attorney, Agent, or Firm* — Shaun J. Fox; Bryan J. Jaketic

(57) ABSTRACT

A tire includes a circumferential tread extending in a circumferential direction circumscribing an axis of rotation. The circumferential tread includes a transverse groove having a plurality of protrusions protruding from a bottom portion of the transverse groove. One or more of a depth, a width, and a length of the transverse groove decreases in a direction parallel to the axis of rotation. The plurality of protrusions are circumferentially spaced apart across the bottom portion of the transverse groove.

17 Claims, 6 Drawing Sheets

(56) References Cited

U.S. PATENT DOCUMENTS

| | | | |
|---|---|---|---|
| 2012/0247632 A1* | 10/2012 | Hayashi | B60C 11/0306 |
| | | | 152/209.22 |
| 2015/0151590 A1 | 6/2015 | Matsuzawa et al. | |
| 2017/0050470 A1* | 2/2017 | Kanematsu | B60C 11/1384 |
| 2018/0015787 A1 | 1/2018 | Hayashi | |
| 2019/0275845 A1* | 9/2019 | Herbst | B60C 11/0309 |

FOREIGN PATENT DOCUMENTS

| | | | |
|---|---|---|---|
| EP | 2439083 A2 * | 4/2012 | B60C 11/005 |
| EP | 2644409 A1 * | 10/2013 | B60C 11/01 |
| EP | 3251877 | 12/2017 | |
| GB | 1236335 | 6/1971 | |
| JP | 11-001105 | 1/1999 | |
| JP | 2009-227154 | 10/2009 | |
| KR | 100493662 | 6/2005 | |

OTHER PUBLICATIONS

International Search Report and Written Opinion; corresponding PCT Application Serial No. PCT/US2019/067136; Authorized Officer Chan Yoon Hwang; Apr. 24, 2020.

European Search Report; corresponding European Application Serial No. EP19898600; Aug 10, 2022.

\* cited by examiner

TIRE WITH EMERGING SNOW FEATURE

FIELD OF INVENTION

The present disclosure relates to a tire having a circumferential tread with a tread feature. More particularly, the present disclosure relates to a tire having a circumferential tread with an emerging snow feature.

BACKGROUND

Tires having circumferential treads with tread elements, such as grooves, lugs, blocks, or ribs, are known in the art. Such tread elements include planar surfaces, curved surfaces, sipes, thin slits, or other tread features to improve traction. Some existing tires have treads with features for improving snow performance, such as studs, deeper tread depth, and biting edges.

SUMMARY OF THE INVENTION

In one embodiment, a tire includes a circumferential tread circumscribing an axis of rotation. The circumferential tread includes at least a first circumferential groove and a second circumferential groove. The tires has a transverse groove disposed between the first circumferential groove and the second circumferential groove. A depth of the transverse groove is defined between an outer surface of the circumferential tread and a bottom portion of the transverse groove in a radial direction perpendicular to the axis of rotation. A first depth of the transverse groove at a first end of the transverse groove is greater than a second depth of the transverse groove at a second end of the transverse groove. The tire includes a plurality of protrusions protruding from the bottom portion of the transverse groove.

In another embodiment, a tire includes a circumferential tread including at least one rib extending in a circumferential direction circumscribing an axis of rotation. The rib includes a transverse groove. A depth of the transverse groove is defined between an outer surface of the rib and a bottom portion of the transverse groove in a radial direction perpendicular to the axis of rotation. The depth of the transverse groove decreases in a direction parallel to the axis of rotation. The tire includes a plurality of protrusions protruding from the bottom portion of the transverse groove.

In yet another embodiment, a tire includes a circumferential tread circumscribing an axis of rotation. The circumferential tread includes a transverse groove extending in a predetermined direction away from a sidewall of the tire toward an equatorial plane of the tire. The transverse groove includes a plurality of protrusions protruding from a bottom portion of the transverse groove. The plurality of protrusions are spaced apart in the circumferential direction.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Lateral" refers to a direction along the tread of the tire going from one sidewall to the other sidewall.

"Radial" or "radially" refer to a direction perpendicular to the axis of rotation of the tire.

"Rib" or "ribs" define the circumferential extending strip or strips of rubber on the tread that is defined by at least one circumferential groove and either a second wide groove or a lateral edge of the tread.

"Sidewall" refers to that portion of the tire between the footprint of the tread and the bead, so the sidewall includes the buttress portion as defined above.

"Tread" refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
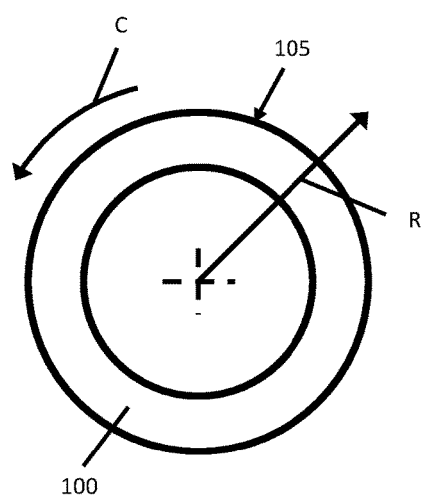
FIG. 1 is a schematic drawing illustrating a side view of a tire.
Figure 2:
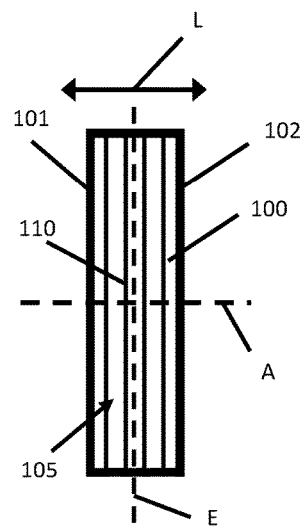
FIG. 2 is a schematic drawing illustrating a front view of the tire of FIG. 1.
Figure 3:
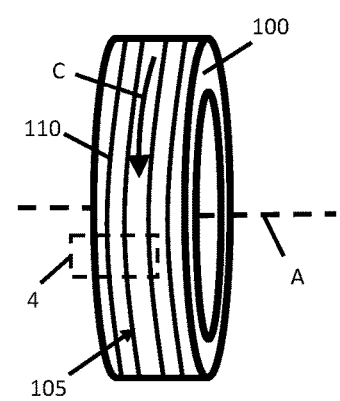
FIG. 3 is a schematic drawing illustrating a perspective view of the tire of FIG. 1 and FIG. 2.

FIG. 1 schematically illustrates a side view of a tire 100 having a circumferential tread 105. As represented by radial direction "R," the tread 105 is formed on an outer circumferential surface of the tire 100 and extends in a circumferential direction "C" around a perimeter of the tire 100. FIG. 2 schematically illustrates a front view of the tire 100 showing the tread 105 circumscribing the axis of rotation "A" of the tire 100 and extending in a lateral direction "L" parallel to the axis of rotation "A" across a width of the tire 100 from a first sidewall 101 to a second sidewall 102. The tire 100 includes one or more circumferential grooves 110 at least partially or entirely circumscribing the axis of rotation "A" and spaced across the width in the lateral direction "L." FIG. 3 schematically illustrates a perspective view of the tire 100, and FIG. 4 illustrates an enlarged portion of the tread 105, taken at view 4 of FIG. 3.

Figure 4:
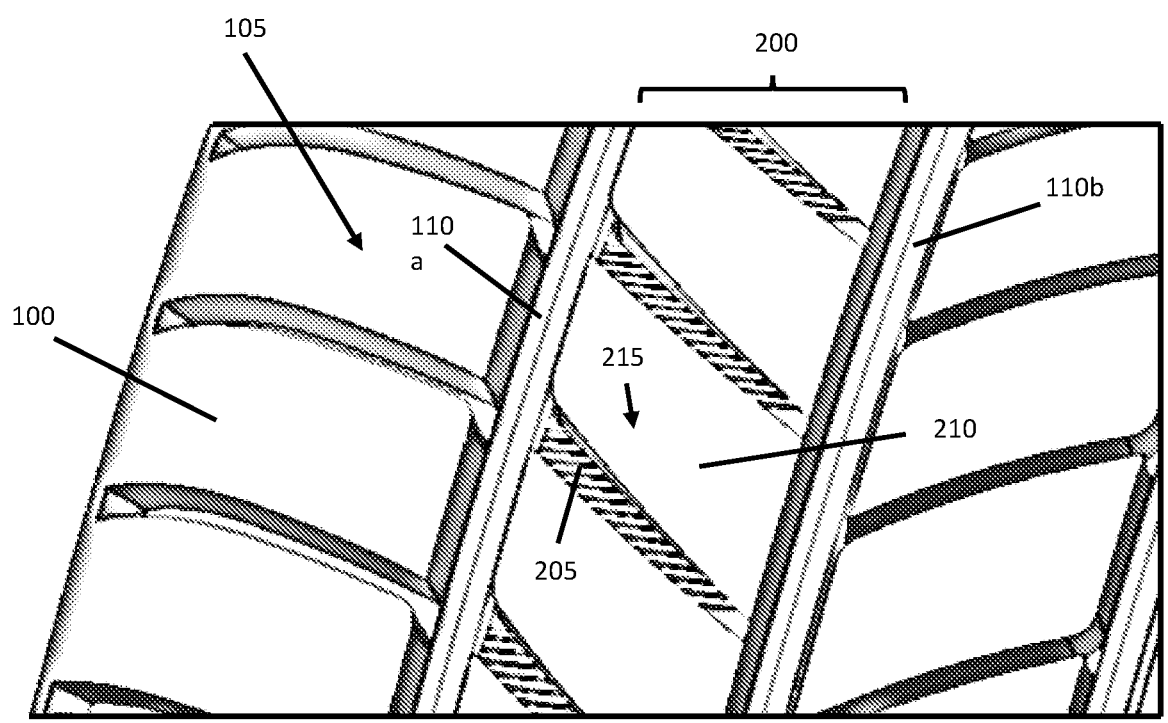
FIG. 4 is an enlarged view of a portion of a circumferential tread of the tire of FIGS. 1-3 taken at view 4 of FIG. 3 showing an embodiment of a plurality of tread elements.

With reference to FIG. 4, the tread 105 includes a circumferential rib 200 defined between a first circumferential groove 110a and a second circumferential groove 110b. The rib 200 includes a plurality of transverse grooves 205 extending from the first circumferential groove 110a to the second circumferential groove 110b. In the illustrated embodiment, the transverse grooves 205 extend entirely across the rib 200, thereby defining a plurality of tread blocks 210 having a tread block surface 215. In some embodiments, some or all of the transverse grooves 205 can extend only partially across the rib 200. For example, one or more transverse grooves 205 can extend from one circumferential groove 110a, 110b to an intermediate location of the tread block 210 stopping short of the other circumferential groove 110b, 110a. Additionally, one or more transverse grooves 205 can extend from a first intermediate location of the tread block 210 to a second intermediate location of the tread block 210, stopping short of the circumferential grooves 110a, 110b. Further, the transverse grooves 205 can extend at any angle relative to the circumferential grooves 110a, 110b. For some applications, orienting the transverse grooves 205 at a non-perpendicular angle relative to the circumferential grooves 110a, 110b provides a pathway to direct water and improve the operability of the tread 105 in wet conditions.

The illustrated tire 100 is merely exemplary, and is intended to show that tread elements may take a variety of geometric shapes. Other tires may have one or more circumferential grooves and transverse grooves that include one or more ribs, blocks, lugs, or other tread elements. It should be understood that the various embodiments discussed below are not limited to any particular tread pattern or any particular tire, but may instead be employed on any tread element of any tire. For example, while the exemplary rib 200 is an intermediate rib, the features discussed herein may be employed on a central rib or shoulder rib in further embodiments.

Figure 5:
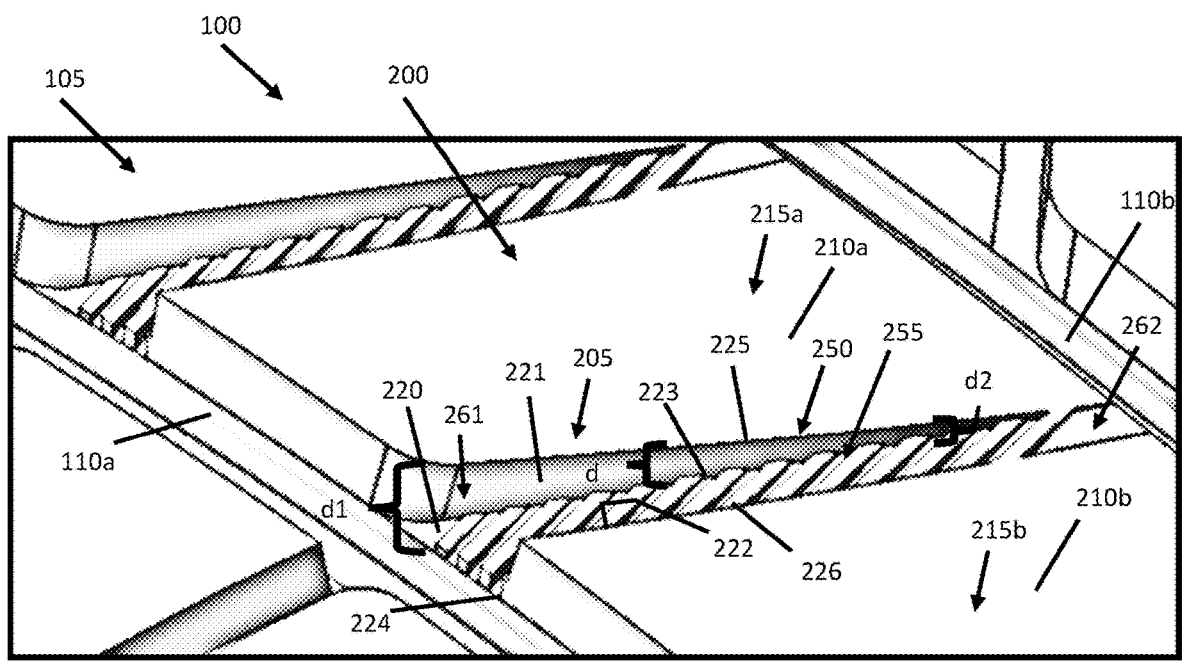
FIG. 5 is an alternate perspective view of the tread feature of the plurality of tread elements of the portion of the circumferential tread of FIG. 4.

FIG. 5 schematically illustrates an alternate perspective view of a portion of the tread 105 of the tire 100 showing transverse groove 205 defined between a first tread block 210a having a first tread block surface 215a and a second tread block 210b having a second tread block surface 215b. The transverse groove 205 includes a bottom portion 220, a first side portion 221, and a second side portion 222. The first side portion 221 extends from the bottom portion 220 to the first surface 215a of the first block 210a, and the second side portion 222 extends from the bottom portion 220 to the second surface 215b of the second block 210b.

Further, the first side portion 221 and the second side portion 222 of the transverse groove 205 extend from the first circumferential groove 110a across the rib 200 to the second circumferential groove 110b. As noted, in some embodiments, the transverse groove 205 can extend partially or entirely across the rib 200. Accordingly, either one or both of the first side portion 221 and the second side portion 222 can extend partially or entirely across the rib 200 in other embodiments.

In the illustrated embodiment, the first side portion 221 and the second side portion 222 are planar walls. In other embodiments, one or both of the first side portion 221 and the second side portion 222 can be non-planar (e.g., curved) walls or include a combination of planar and non-planar walls. Likewise, the bottom portion 220 of the transverse groove 205 is illustrated as a planar surface with the understanding that the bottom portion 220 can be a non-planar (e.g., curved) surface or include a combination of planar and non-planar surfaces in other embodiments. In the illustrated embodiment, the first side portion 221 connects to the bottom portion 220 at first corner 223, and the second side portion 222 connects to the bottom portion 220 at second corner 224. Similarly, the first side portion 221 connects to the first surface 215a at first edge 225, and the second side portion 222 connects to the second surface 215b at second edge 226. The transverse groove 205 has a radially outwardly facing opening 250 defined between the first edge 225 and the second edge 226.

Although the first corner 223, second corner 224, first edge 225, and second edge 226 are illustrated as forming a right angle, the embodiments of the disclosure are not so limited. For example, in other embodiments, one or more of the first corner 223, second corner 224, first edge 225, and second edge 226 can form other angles including acute and obtuse angles, and can include a chamfer or a fillet. The first side portion 221, second side portion 222, and bottom portion 220 provide the transverse groove 205 as a recess with a continuous surface or surfaces extending from the first surface 215a to the second surface 215b.

A depth "d" of the transverse groove 205 is defined between the bottom portion 220 and the first surface 215a or the second surface 215b. In the illustrated embodiment, a first depth "d1" of the transverse groove 205 is greater than a second depth "d2" of the transverse groove 205. For example, the depth "d" of the transverse groove 205 can decrease across the rib 200 from the first circumferential groove 110a to the second circumferential groove 110b. The depth "d" is illustrated as decreasing linearly (e.g., defined by a linear function) across the rib 200 from the first circumferential groove 110a to the second circumferential groove 110b, although the depth "d" can decrease non-linearly (e.g., defined by a non-linear function, stepped) in further embodiments. In the illustrated embodiment, the depth "d" of the transverse groove 205 decreases across the rib 200 in a direction toward the equatorial plane "E" of the tire 100. In some embodiments, the depth "d" of the transverse groove 205 can decrease across the rib 200 in a direction away from the equatorial plane "E" of the tire 100.

The transverse groove 205 includes a plurality of protrusions 255 protruding from the bottom portion 220 of the transverse groove 205. The plurality of protrusions 255 are spaced apart across the bottom portion 220. The plurality of protrusions 255 can be circumferentially or laterally spaced at equal or unequal increments from a first end 261 of the transverse groove 205 to a second end 262 of the transverse groove 205. Additionally, the plurality of protrusions 255 extend from the first side portion 221 across the transverse groove 205 to the second side portion 222.

In some embodiments, one or more of the plurality of protrusions 255 can have a constant height or a variable height. For example, in some embodiments a height of one or more of the plurality of protrusions 255 can be constant from the first side portion 221 across the transverse groove 205 to the second side portion 222. Alternatively, in some embodiments a height of one or more of the plurality of protrusions 255 can vary from the first side portion 221 across the transverse groove 205 to the second side portion 222. For example, a ramped protrusion can have a height of zero at the first side portion 221, increasing across the transverse groove 205 to a non-zero height at the second side portion 222.

Each of the plurality of protrusions 255 can protrude (e.g., extend radially outward) from the bottom portion 220 of the transverse groove 205 an equal distance. For example a distance along the depth "d" of the transverse groove 205 measured from the first surface 215a or the second surface 215b to a radially outermost location of a protrusion 255 at the first end 261 of the transverse groove 205 can be greater than a corresponding distance along the depth "d" of the transverse groove 205 measured from the first surface 215a or the second surface 215b to a radially outermost location of a protrusion 255 at the second end 262 of the transverse groove 205.

Figure 6:
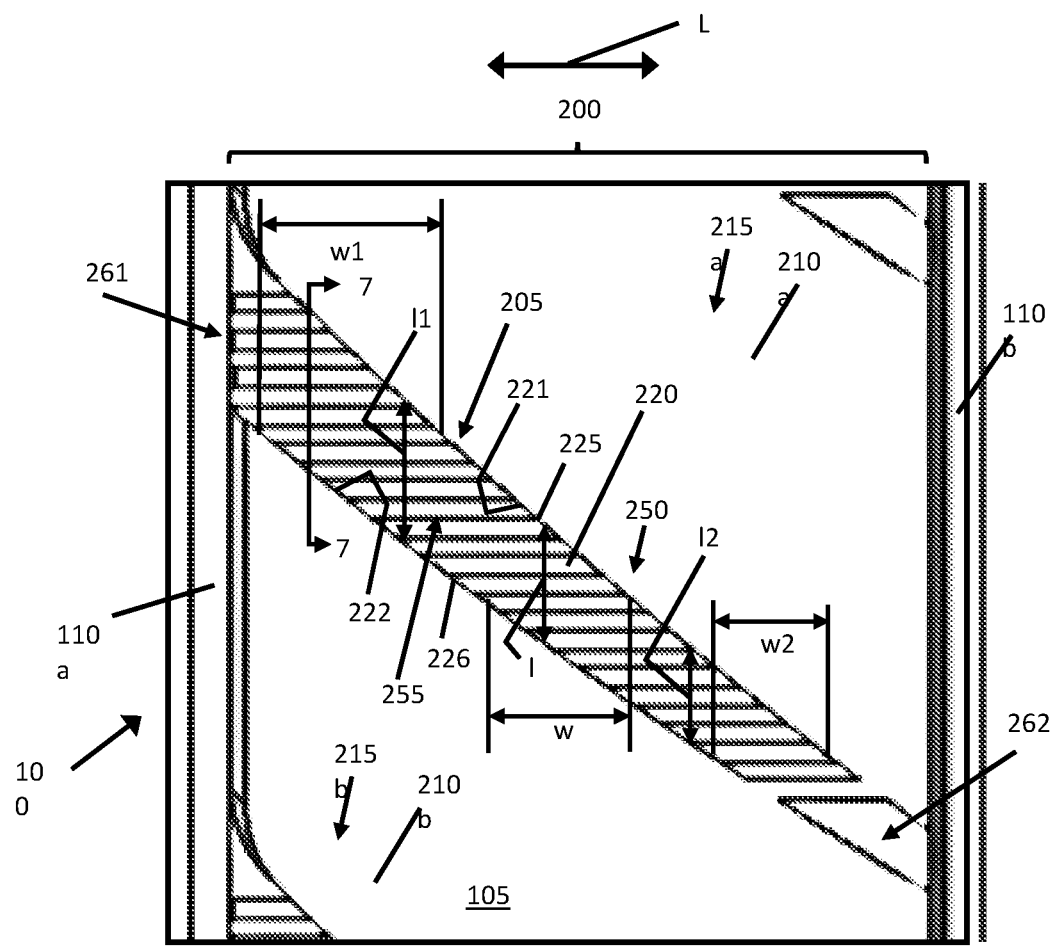
FIG. 6 is a plan view of the tread feature of FIG. 5.

FIG. 6 illustrates a plan view of the transverse groove 205 of FIG. 5. In the illustrated embodiment, each of the plurality of protrusions 255 extends parallel to the lateral direction "L" from the first side portion 221 across the transverse groove 205 to the second side portion 222. In other embodiments, each of the plurality of protrusions 255 can extend from the first side portion 221 across the transverse groove 205 to the second side portion 222 at an angle that is not parallel to the lateral direction "L." For example, each of the plurality of protrusions 255 can extend from the first side portion 221 across the transverse groove 205 to the second side portion 222 at an angle that is neither parallel to the lateral direction "L" nor perpendicular to the lateral direction "L." Moreover, all of the protrusions 255 can extend at the same angle relative to the lateral direction "L," as shown, or at different angles relative to the lateral direction "L." The plurality of protrusions 255 can be provided as machined, molded, printed, chemically etched, cast, laser engraved or laser ablated features. For example, in some embodiments, a tire curing mold (not shown) can be machined to include a relief of the plurality of protrusions to impart the plurality of protrusions 255 on a tire during a tire molding process. Moreover, the plurality of protrusions 255 can be provided as serrations or voids in the groove bottom 220, such that the groove bottom 220 itself defines the plurality of protrusions 255 protruding relative to the recessed serrations or voids. In other words, unless otherwise noted, the plurality of protrusions 255 can be formed as a positive impression or a negative impression on the groove bottom 220, where the groove bottom 220 includes a plurality of radially offset surfaces.

A lateral width "w" of the transverse groove 205 is defined between the first side portion 221 and the second side portion 222. In the illustrated embodiment, a first width "w1" of the transverse groove 205 is greater than a second width "w2" of the transverse groove 205. For example, the width "w" of the transverse groove 205 can decrease across the rib 200 from the first circumferential groove 110a to the second circumferential groove 110b. The width "w" is illustrated as decreasing linearly (e.g., defined by a linear function) across the rib 200 from the first circumferential groove 110a to the second circumferential groove 110b, although the width "w" can decrease non-linearly (e.g., defined by a non-linear function, stepped) in further embodiments. In the illustrated embodiment, the width "w" of the transverse groove 205 decreases across the rib 200 in a direction toward the equatorial plane "E" of the tire 100. In some embodiments, the width "w" of the transverse groove 205 can decrease across the rib 200 in a direction away from an equatorial plane "E" of the tire 100.

The width "w" is defined as a dimension parallel to the lateral direction "L." In some embodiments, the first width "w1" can be defined as a maximum width of the transverse groove 205, and the second width "w2" can be defined as a minimum width of the transverse groove 205, where "w1">"w2," and intermediate widths "wi" defined along the transverse groove 205 between the first width "w1" and the second width "w2" are defined as "w1">"wi">"w2." It should be understood that the width "w" of the transverse groove 205 may be less than the first width "w1" at the first end 261 of the transverse groove 205 where the transverse groove 205 terminates at the first circumferential groove 110a, while still providing the first width "w1" at the first end 261 greater than the second width "w2" at the second end 262.

A circumferential length "l" of the transverse groove 205 is defined between the first side portion 221 and the second side portion 222. In the illustrated embodiment, a first length "l1" of the transverse groove 205 is greater than a second length "l2" of the transverse groove 205. For example, the length "l" of the transverse groove 205 can decrease across the rib 200 from the first circumferential groove 110a to the second circumferential groove 110b. The length "l" is illustrated as decreasing linearly (e.g., defined by a linear function) across the rib 200 from the first circumferential groove 110a to the second circumferential groove 110b, although the length "l" can decrease non-linearly (e.g., defined by a non-linear function, stepped) in further embodiments. In the illustrated embodiment, the length "l" of the transverse groove 205 decreases across the rib 200 in a direction toward the equatorial plane "E" of the tire 100. In some embodiments, the length "l" of the transverse groove 205 can decrease across the rib 200 in a direction away from an equatorial plane "E" of the tire 100.

The length "l" is defined as a dimension parallel to the circumferential direction "C." In some embodiments, the first length "l1" can be defined as a maximum length of the transverse groove 205, and the second length "l2" can be defined as a minimum length of the transverse groove 205, where "l1">"l2," and intermediate lengths "li" defined along the transverse groove 205 between the first length "l1" and the second length "l2" are defined as "l1">"li">"l2."

One or more of the width "w," depth "d," and length "l" of the transverse groove 205 can decrease along the transverse groove 205 in a direction parallel to the axis of rotation "A." For example, in some embodiments, one or more of the width "w," depth "d," and length "l" of the transverse groove 205 can decrease in a direction parallel to the axis of rotation "A" from the first end 261 to the second end 262, or from the first circumferential groove 110a to the second circumferential groove 110b. By decreasing one or more of the width "w," depth "d," and length "l" of the transverse groove 205 in a direction parallel to the axis of rotation "A," a volume of the transverse groove 205 or an area of the opening 250 of the transverse groove 205 likewise decreases in a direction parallel to the axis of rotation "A." Said another way, increasing one or more of the width "w," depth "d," and length "l" of the transverse groove 205 in a direction parallel to the axis of rotation "A," increases a volume of the transverse groove 205 or an area of the opening 250 of the transverse groove 205 in a direction parallel to the axis of rotation "A." Increasing or decreasing one or more of the width "w," depth "d," and length "l" of the transverse groove 205 in a direction parallel to the axis of rotation "A" can provide advantages with respect to particular wear patterns of the tire 100.

During normal operation of the tire 100 including the transverse groove 205 with a plurality of protrusions 255, a wear pattern of the circumferential tread 105 can occur where the first surface 215a of the first block 210a and the second surface 215b of the second block 210b wear (e.g., are worn away or removed) laterally across the rib 200 from the second end 262 of the transverse groove 205 to the first end 261 of the transverse groove 205. For example, normal operation of the tire, including rotation about the axis of revolution "A" (see FIG. 2), braking, or turning, can cause the circumferential tread 105 to wear outward from the equatorial plane "E" of the tire 100 toward the respective sidewalls 101, 102.

Because of the varying depth of the transverse groove 205, as the circumferential tread 105 of the tire 100 wears, the existence or presence of either or both of the first edge 225 and the second edge 226 resolves (e.g., disappears) into the first surface 215a of the first block 210a and the second surface 215b of the second block 210b. In some embodiments, either or both of the first edge 225 and the second edge 226 can function as a biting edge that enables the circumferential tread 105 to grip a road surface, particularly a snow-covered road surface. Thus, as either or both of the first edge 225 and the second edge 226 resolves during normal operation of the tire 100, the gripping ability of the circumferential tread 105 decreases. The tread feature of the present disclosure, including the transverse groove 205 with a plurality of protrusions 255 provides an inventive solution to counter this phenomenon. As the tire wears, the first surfaces 215a, 215b of the first and second blocks 210a, 210b are in closer proximity to more, and longer protrusions 255, and thus to more biting edges. For example, the tread feature of the present disclosure can increase the usable life of a tire 100, increase performance of a tire 100, provide a safer tire 100 for all weather conditions including snow, and can ensure a constant or consistent performance during the entire usable life of the tire 100, even as one or more portions of the tire 100 wears.

Figure 7:
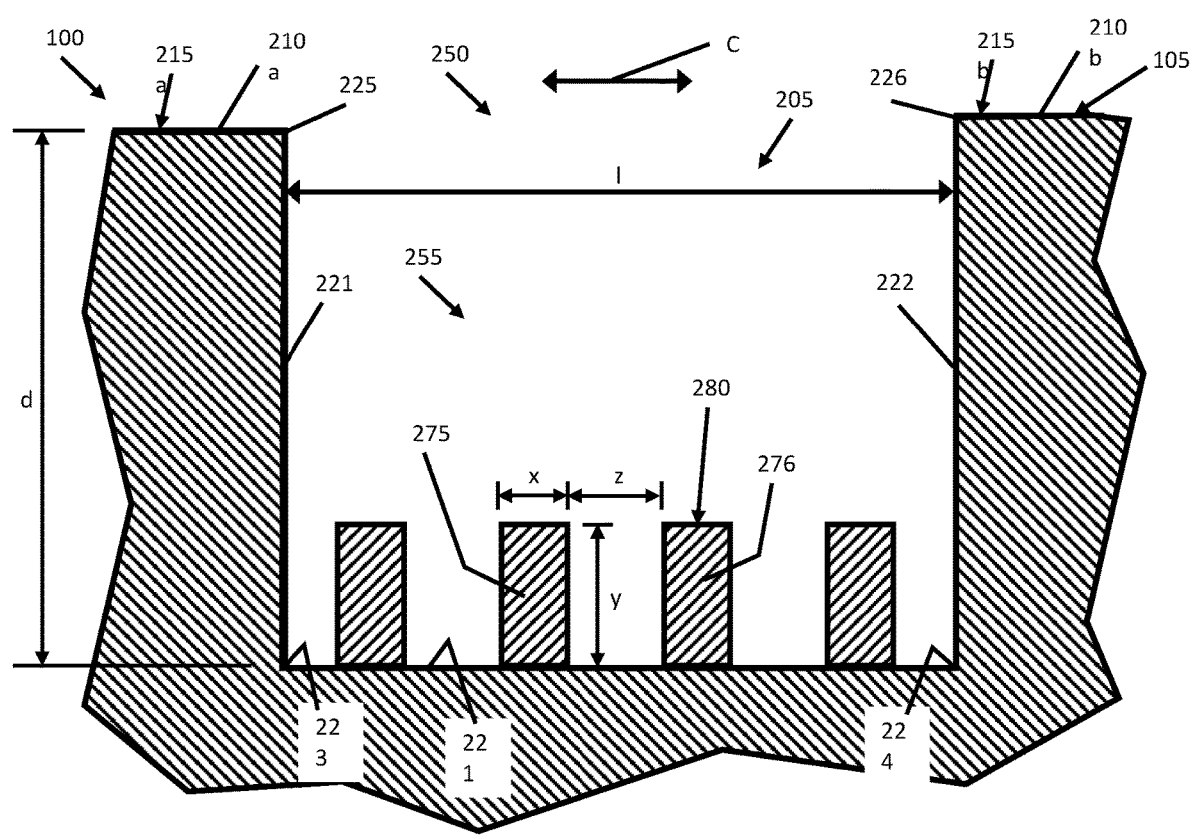
FIG. 7 is a schematic drawing illustrating a partial cross-sectional view of the tread feature taken along line 7-7 of FIG. 6 prior to normal operation of the tire.

FIG. 7 schematically illustrates a partial cross-sectional view of the transverse groove 205 of FIG. 6, taken along line 7-7 of FIG. 6, representing a new or unused state of the tire 100. The plurality of protrusions 255 are shown with a first protrusion 275 having a first dimension "x" in the circumferential directional "C" and a second dimension "y" in the radial direction "R." The first protrusion 275 is spaced apart from an immediately adjacent second protrusion 276 a distance "z" in the circumferential direction "C." While the plurality of protrusions 255 are shown as having a rectangular geometry, other shapes, geometries, and sizes can be provided in further embodiments. For example, one or more protrusions 255 can have a rounded profile or a polygonal profile. In one embodiment, "x" can be approximately 1 mm, "y" can be between 0.5 mm and 1 mm, and "z" can be approximately 0.5 mm. If further examples, "x" can be between 0.5 mm and 1.5 mm, "y" can be between 0 mm and 2 mm, and "z" can be between 0.2 mm and 1 mm.

With reference to protrusion 276, each of the protrusions 255 includes a top surface 280 facing the opening 250 of the transverse groove 205. In some embodiments, the top surface 280 can have a textured or rough surface. For example, the top surface 280 can be machined, molded, printed, chemically etched, cast, laser engraved or laser ablated to have a surface roughness that increases the coefficient of friction between the top surface 280 and an abutting surface (e.g., road surface) contacting the top surface 280.

In addition to the top surface 280, other surfaces (e.g., first side portion 221, bottom portion 220, second side portion 222, and other surfaces of the plurality of protrusions 250 can include a similarly textured or roughened surface. For example, in some embodiments, the plurality of protrusions 255 can be formed by providing the groove bottom 220 as a textured or rough surface defining the plurality of protrusions 255. In further embodiments, rather than forming the plurality of protrusions 255, the textured or rough surface can be provided directly within the groove 205 and can function as the plurality of protrusions. The textured or rough surfaces of the groove bottom 220 (or other surfaces) can have a roughness between P20 and P40 grit sandpaper with asperities between approximately 0.4 mm and 1 mm Any one or more surfaces can be machined, molded, printed, chemically etched, cast, laser engraved or laser ablated to provide the asperities defining the surface roughness.

Figure 8:
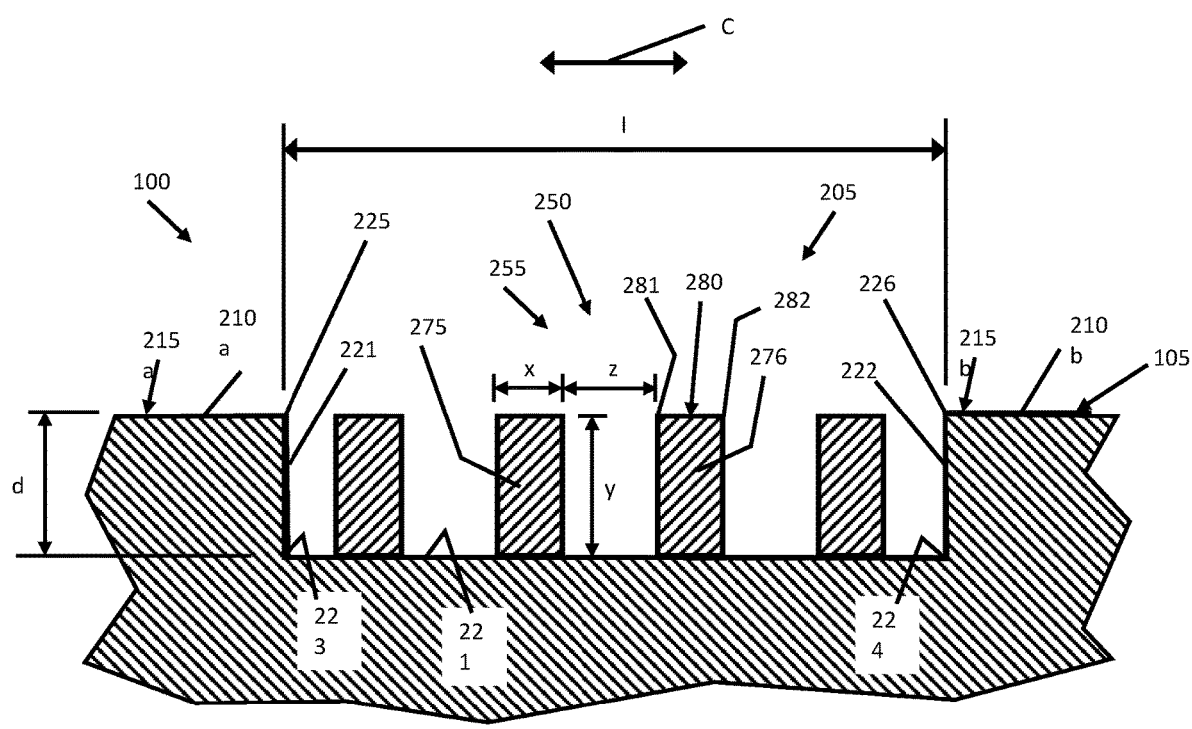
FIG. 8 is a schematic drawing illustrating the partial cross-sectional view of the tread feature of FIG. 7 after normal operation of the tire.

As the circumferential tread 105 of the tire 100 wears, the existence or presence of either or both of the first edge 225 and the second edge 226 resolves (e.g., disappears) into the first surface 215a of the first block 210a and the second surface 215b of the second block 210b. Moreover, the first surface 215a and the second surface 215b wear down over time during normal operation of the tire 100. For example, FIG. 8 schematically illustrates the partial cross-sectional view of the transverse groove 205 of FIG. 7 after the tire 100 is partially worn. As illustrated, the first surface 215a and the second surface 215b are worn down and the depth "d" of the transverse groove 205 decreases. With the first surface 215a and the second surface 215b reduced, the top surface 280 of one or more of the plurality of protrusions 255 emerges and comes into contact with the road surface. Additionally, edges 281, 282 of the top surface 280 can function as biting edges that further enable the circumferential tread 105 to grip a road surface, particularly a snow-covered road surface.

Referring back to FIG. 6, during normal operation of the tire 100, a wear pattern of the circumferential tread 105 can occur where the first surface 215a of the first block 210a and the second surface 215b of the second block 210b wear laterally across the rib 200 from the second end 262 of the transverse groove 205 to the first end 261 of the transverse groove 205. As the surfaces 215a, 215b continue to wear in the lateral direction "L," the plurality of protrusions 250 emerge from the second end 262 of the transverse groove 205 to the first end 261 of the transverse groove 205. The gradual or sequential emergence of the plurality of grooves 250 can increase the usable life of the tire 100, increase performance of the tire 100, provide a safer tire 100 for all weather conditions including snow, and can ensure a constant or consistent performance during the entire usable life of the tire 100, even as one or more portions of the tire 100 wears.

For example, as the surfaces 215a, 215b wear in the lateral direction "L," from the second end 262 to the first end 261, one may expect the performance (e.g., gripping capability) of the tire 100 to decrease as a function of wear, with more wear equating to a decrease in performance. However, because the plurality of protrusions 255 emerge as a function of wear, the performance of the tire 100 of the present disclosure may improve over the entire operational life of the tire 100 as compared to a tire without the transverse groove 205 and the plurality of protrusions 255.

In some embodiments, with the depth "d" of the transverse groove 205 decreasing from first depth "d1" at the first end 261 to second depth "d2" at the second end 262, the plurality of protrusions 255 first emerge at the second end 262 and then continue to emerge in a direction towards the first end 261 as the tire 100 wears. Moreover, with the width "w" of the transverse groove 205 decreasing from first width "w1" at the first end 261 to second width "w2" at the second end 262, the corresponding surface area of emerged protrusions is smaller at the second end 262 when the plurality of protrusions 250 first emerge (and the surfaces 215a, 215b of the blocks 210a, 201b are providing more grip) and then continues to increase in a direction towards the first end 261 as the tire 100 wears (and the surfaces 215a, 215b of the blocks 210a, 201b are providing less grip). Likewise, with the length "l" of the transverse groove 205 decreasing from first length "l1" at the first end 261 to second length "l2" at the second end 262, the corresponding surface area of emerged protrusions is smaller at the second end 262 when the plurality of protrusions 250 first emerge (and the surfaces 215a, 215b of the blocks 210a, 201b are providing more grip) and then continues to increase in a direction towards the first end 261 as the tire 100 wears (and the surfaces 215a, 215b of the blocks 210a, 201b are providing less grip).

In some embodiments, the characteristics of the transverse groove 205 and the plurality of protrusions 255 can be selected to provide a predetermined rate of emergence of surface area (e.g., top surface 280) of the plurality of protrusions 255. For example, in some embodiments, the rate of emergence of the surface area of the plurality of protrusions 255 can be selected to maintain a constant gripping capability and, therefore, constant tire performance over the life of the tire 100 as the tire 100 wears under normal operation. Alternatively, the rate of emergence of the surface area of the plurality of protrusions 255 can be selected to increase gripping capability and, therefore, increase tire performance over the life of the tire 100 as the tire 100 wears under normal operation. Moreover, the plurality of protrusions 255 can also perform a snow trapping function that further improves performance of the tire 100 in snowy weather conditions. Such considerations are exemplary, and should be understood as non-limiting examples of different ways in which the plurality of protrusions 255 can provide the tire 100 with desirable performance properties based on one or more of intended road conditions (e.g., rain, snow, all weather), intended life of the tire, type of vehicle with which the tire is used, geographic location of the tire, market factors, cost, and consumer feedback and preferences.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
a circumferential tread circumscribing an axis of rotation, the circumferential tread including at least a first circumferential groove and a second circumferential groove;
a transverse groove having a first end that terminates at the first circumferential groove and further having a second end that terminates at the second circumferential groove, wherein a depth of the transverse groove is defined between an outer surface of the circumferential tread and a bottom surface of the transverse groove in a radial direction perpendicular to the axis of rotation, wherein the depth of the transverse groove decreases linearly from the first circumferential groove to the second circumferential groove such that a first depth of the transverse groove at the first end of the transverse groove is greater than a second depth of the transverse groove at the second end of the transverse groove, and
a plurality of protrusions protruding from the bottom surface of the transverse groove,
wherein each of the plurality of protrusions has the same height, as measured from the bottom surface of the transverse groove to a top surface of the protrusion,
wherein at least one of the plurality of protrusions has a top surface at a same elevation as the outer surface of the circumferential tread, and
wherein at least one of the plurality of protrusions has a top surface that is below the outer surface of the circumferential tread.

2. The tire of claim 1, wherein the transverse groove includes a first side portion extending from the bottom surface to a first edge of the transverse groove and a second side portion extending from the bottom surface to a second edge of the transverse groove, and wherein the plurality of protrusions extend across the transverse groove from the first side portion to the second side portion.

3. The tire of claim 2, wherein a width of the transverse groove is defined between the first side portion and the second side portion in a lateral direction parallel to the axis of rotation, and wherein a first width of the transverse groove at the first end of the transverse groove is greater than a second width of the transverse groove at the second end of the transverse groove.

4. The tire of claim 3, wherein the transverse groove extends from the first circumferential groove to the second circumferential groove, and wherein the width of the transverse groove decreases from the first circumferential groove to the second circumferential groove.

5. The tire of claim 2, wherein a length of the transverse groove is defined between the first side portion and the second side portion in a circumferential direction, and wherein a first length of the transverse groove at the first end of the transverse groove is greater than a second length of the transverse groove at the second end of the transverse groove.

6. The tire of claim 5, wherein the transverse groove extends from the first circumferential groove to the second circumferential groove, and wherein the length of the transverse groove decreases from the first circumferential groove to the second circumferential groove.

7. The tire of claim 1, wherein the plurality of protrusions protrude an equal distance from the bottom surface of the transverse groove.

8. The tire of claim 1, wherein the plurality of protrusions are spaced apart in a circumferential direction across the bottom surface of the transverse groove.

9. A tire comprising:
a circumferential tread including at least one rib extending in a circumferential direction circumscribing an axis of rotation, the rib including:
a transverse groove extending completely through the rib such that the transverse groove has a first end at a first side of the rib and a second end at a second side of the rib, wherein a depth of the transverse groove is defined between an outer surface of the rib and a bottom surface of the transverse groove in a radial direction perpendicular to the axis of rotation, and wherein the depth of the transverse groove decreases linearly in a direction parallel to the axis of rotation from the first end of the transverse groove to the second end of the transverse groove; and
a plurality of protrusions protruding from the bottom surface of the transverse groove,
wherein each of the plurality of protrusions has the same height, as measured from the bottom surface of the transverse groove to a top surface of the protrusion,
wherein at least one of the plurality of protrusions has a top surface at a same elevation as the outer surface of the rib, and
wherein at least one of the plurality of protrusions has a top surface that is below the outer surface of the rib.

10. The tire of claim 9, wherein the transverse groove has a first side portion extending from the bottom surface of the transverse groove to a first edge of the transverse groove and a second side portion extending from the bottom surface to a second edge of the transverse groove, wherein a width of the transverse groove is defined between the first side portion and the second side portion in a lateral direction parallel to the axis of rotation, and wherein the width of the transverse groove decreases in the direction parallel to the axis of rotation.

11. The tire of claim 9, wherein the transverse groove has a first side portion extending from the bottom surface of the transverse groove to a first edge of the transverse groove and a second side portion extending from the bottom surface to a second edge of the transverse groove, wherein a length of the transverse groove is defined between the first side portion and the second side portion in the circumferential direction, and wherein the length of the transverse groove decreases in the direction parallel to the axis of rotation.

12. The tire of claim 9, wherein a width of the transverse groove in a lateral direction parallel to the axis of rotation decreases in the direction parallel to the axis of rotation, and wherein a length of the transverse groove in the circumferential direction decreases in the direction parallel to the axis of rotation.

13. The tire of claim 9, wherein the transverse groove has a first side portion extending from the bottom surface of the transverse groove to a first edge of the transverse groove and a second side portion extending from the bottom surface to a second edge of the transverse groove, and wherein the plurality of protrusions extend across the transverse groove from the first side portion to the second side portion.

14. A tire comprising:
a circumferential tread circumscribing an axis of rotation, the circumferential tread including:
a plurality of circumferential grooves, including at least a first circumferential groove and a second circumferential groove;
a transverse groove extending in a predetermined direction away from a sidewall of the tire toward an equatorial plane of the tire, such that the transverse groove has a first end terminating at the first circumferential groove and a second end terminating at the second circumferential groove,
wherein a depth of the transverse groove is defined between an outer surface of the circumferential tread and a bottom surface of the transverse groove in a radial direction perpendicular to the axis of rotation,
wherein the depth of the transverse groove decreases linearly from a first end of the transverse groove to a second end of the transverse groove,
wherein the transverse groove includes a plurality of protrusions protruding from a bottom surface of the transverse groove,
wherein the plurality of protrusions are spaced apart in the circumferential direction,
wherein each of the plurality of protrusions has the same height, as measured from the bottom surface of the transverse groove to a top surface of the protrusion,
wherein at least one of the plurality of protrusions has a top surface at a same elevation as the outer surface of the circumferential tread, and
wherein at least one of the plurality of protrusions has a top surface that is below the outer surface of the circumferential tread.

15. The tire of claim 14, wherein a width of the transverse groove is defined in a lateral direction parallel to the axis of rotation, and wherein the width of the transverse groove decreases from the first end of the transverse groove to the second end of the transverse groove.

16. The tire of claim 14, wherein each protrusion of the plurality of protrusions extends across the transverse groove in a lateral direction parallel to the axis of rotation.

17. The tire of claim 14, wherein the top surface of each of the plurality of protrusions has at least one edge extending in a lateral direction.

* * * * *